United States Patent
Taki et al.

(10) Patent No.: US 10,990,823 B2
(45) Date of Patent: Apr. 27, 2021

(54) MONITORING SYSTEM

(71) Applicant: KYOCERA Document Solutions Inc., Osaka (JP)

(72) Inventors: Kosuke Taki, Osaka (JP); Yoichi Hiranuma, Osaka (JP); Fumiya Sakashita, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 135 days.

(21) Appl. No.: 16/365,771

(22) Filed: Mar. 27, 2019

(65) Prior Publication Data
US 2019/0303671 A1 Oct. 3, 2019

(30) Foreign Application Priority Data
Mar. 29, 2018 (JP) .............................. JP2018-063964

(51) Int. Cl.
*G06K 9/00* (2006.01)
*G06F 3/14* (2006.01)

(52) U.S. Cl.
CPC ....... *G06K 9/00671* (2013.01); *G06F 3/1407* (2013.01)

(58) Field of Classification Search
None
See application file for complete search history.

(56) References Cited

U.S. PATENT DOCUMENTS

| 2016/0253579 | A1* | 9/2016 | Bamba | G06K 9/00771 382/103 |
| 2018/0247135 | A1* | 8/2018 | Oami | G06K 9/00778 |
| 2019/0213212 | A1* | 7/2019 | Adato | G06K 9/00624 |
| 2019/0236531 | A1* | 8/2019 | Adato | G06Q 10/087 |

FOREIGN PATENT DOCUMENTS

| CN | 105554471 A | 5/2016 |
| CN | 106851209 A | 6/2017 |
| JP | 2011-234237 A | 11/2011 |

OTHER PUBLICATIONS

An Office Action mailed by China National Intellectual Property Administration dated Aug. 21, 2020, which corresponds to Chinese Patent Application No. 201910240358.4 and is related to U.S. Appl. No. 16/365,771 with English language translation.

* cited by examiner

*Primary Examiner* — Fayyaz Alam
(74) *Attorney, Agent, or Firm* — Studebaker & Brackett PC

(57) ABSTRACT

A monitoring system includes an imaging device and a control device. The control device includes a device communication section, a device controller, and device storage. The device controller includes an assignment section and a count section. The imaging device captures an image of an imaging area to generate captured image data indicating the captured image. The device controller acquires the captured image data from the imaging device through the device communication section. The assignment section assigns a plurality of candidate detection ranges to the captured image. The count section counts the number of occurrences of a specific event in each of the candidate detection ranges. The device storage stores therein the number of occurrences of the specific event in association with each of the candidate detection ranges.

6 Claims, 8 Drawing Sheets

MONITORING SYSTEM

INCORPORATION BY REFERENCE

The present application claims priority under 35 U.S.C. § 119 to Japanese Patent Application No. 2018-063964, filed on Mar. 29, 2018. The contents of this application are incorporated herein by reference in their entirety.

BACKGROUND

The present disclosure relates to a monitoring system.

In recent years, more monitoring systems have been introduced for crime deterrent, accident prevention, and the like. Particularly, a number of monitoring systems are installed in a facility accessible by unknown individuals, such as a hotel, a commercial building, a convenience store, a financial institution, a freeway, and a railroad. A monitoring system captures images of a monitoring target person or a monitoring target vehicle with a camera and transmits captured image data generated through the image capture to a monitoring center such as an administrative office or a security office. Monitoring personnel monitors the captured images. The captured images are recorded as desired or needed.

However, the images captured by the monitoring system may include a window of a general house or anything related to personal information, raising concerns about invasion of privacy. To deal with such concerns, a known camera system acquires an image using a camera and displays the acquired image on a display device with a mask region set on the displayed image.

SUMMARY

A monitoring system according to an aspect of the present disclosure includes a data acquisition section, an assignment section, a count section, and storage. The data acquisition section acquires captured image data indicating a captured image. The assignment section assigns a plurality of candidate detection ranges to the captured image. The count section counts the number of occurrences of a specific event in each of the candidate detection ranges. The storage stores therein the number of occurrences of the specific event in association with each of the candidate detection ranges.

DETAILED DESCRIPTION

Figure 1:
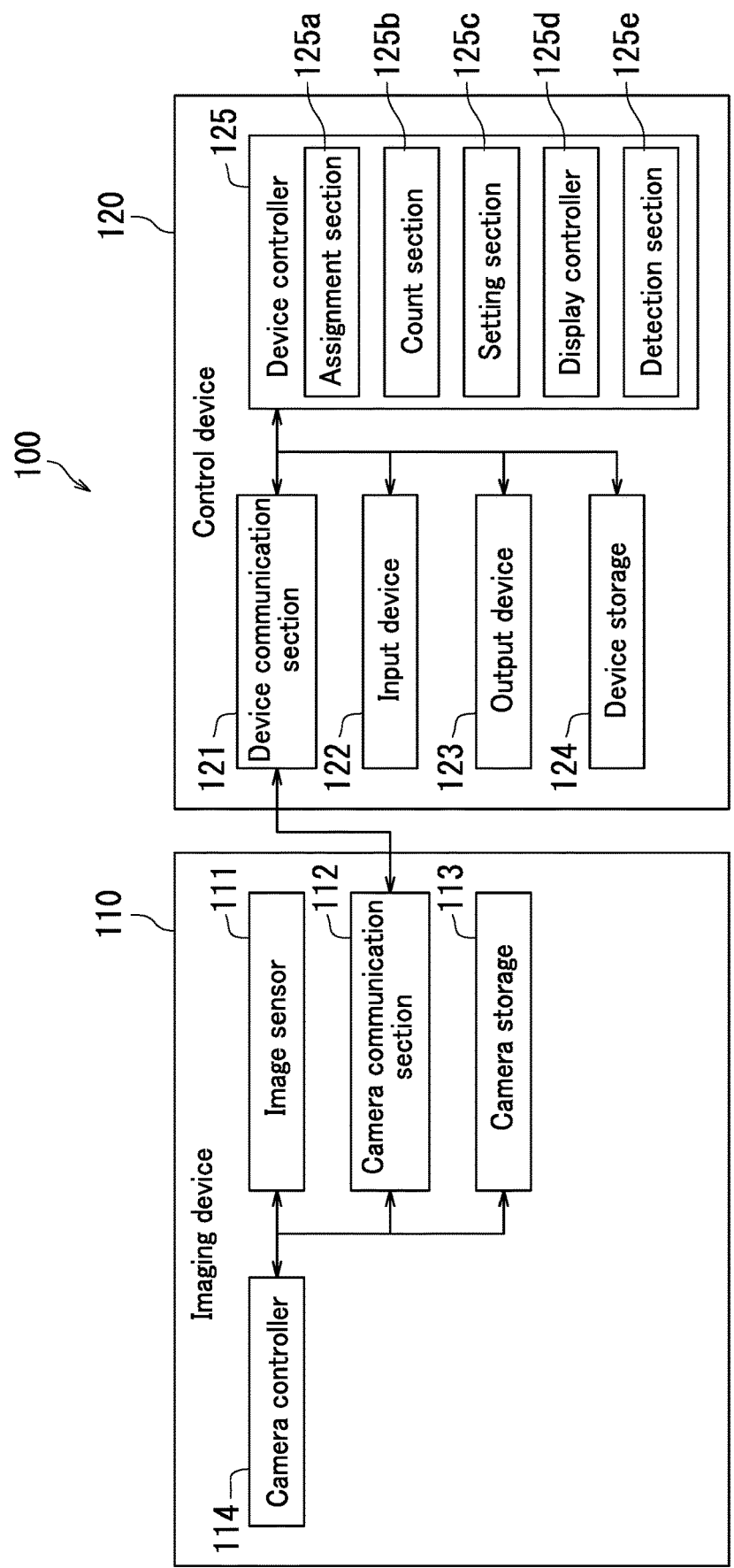
FIG. 1 is a block diagram of a monitoring system according to an embodiment of the present disclosure.

The following describes a monitoring system according to an embodiment of the present disclosure with reference to the accompanying drawings. Elements that are the same or equivalent are indicated by the same reference signs in the drawings and description thereof is not repeated.

The following describes a monitoring system 100 according to the present embodiment with reference to FIG. 1. FIG. 1 is a block diagram of the monitoring system 100 according to the present embodiment.

The monitoring system 100 includes an imaging device 110 and a control device 120. The imaging device 110 captures an image of an imaging area to generate captured image data indicating the captured image. The image captured by the imaging device 110 may be video or still. The control device 120 controls the imaging device 110. The control device 120 also assists a user in setting an area to be detected (also referred to below as a "detection range").

The imaging device 110 includes an image sensor 111, a camera communication section 112, camera storage 113, and a camera controller 114.

The image sensor 111 captures an image of the imaging area. The image sensor 111 generates data indicating the captured image and transmits the data to the camera controller 114. The data indicating the captured image is referred to below as "captured image data". The image sensor 111 is for example a charge coupled device (CCD) image sensor or a complementary metal oxide semiconductor (CMOS) image sensor.

The camera communication section 112 is capable of communicating with an electronic device equipped with a communication device that uses the same communication method (protocol). The camera communication section 112 communicates with the control device 120 through a network such as a local area network (LAN). The camera communication section 112 is for example a communication module (communication device) such as a LAN board. The camera communication section 112 transmits the captured image data to the control device 120 in response to an instruction from the camera controller 114.

The camera storage 113 stores various data therein. The camera storage 113 includes semiconductor memory. The semiconductor memory for example includes random-access memory (RAM) and read-only memory (ROM). The camera storage 113 may have a function of storing the captured image data equivalent to a specific period of time.

The camera controller 114 controls operation of each section of the imaging device 110 by executing a camera control program stored in the camera storage 113. The camera controller 114 includes a processor. The processor may include a central processing unit (CPU). Alternatively, the processor may include a microcomputer. Alternatively, the processor may include an application specific processing unit.

The camera controller 114 transmits the captured image data to the control device 120 through the camera communication section 112. The camera controller 114 may transmit the captured image data generated in real time. The camera controller 114 may alternatively transmit the captured image data stored in the camera storage 113 in response to a transmission request from the control device 120.

The camera controller 114 may further have a time acquisition section (not shown). A time acquired by the time acquisition section may be used as a time stamp of the captured image data. The time acquisition section may measure time by itself. For example, the time acquisition section may include a real-time clock. The time acquisition section does not need to measure time by itself. For example, the time acquisition section may receive data indicating time from an external device through the camera communication section 112. Specifically, the time acquisition section may for example receive data indicating time from the control device 120 through the device communication section 121 and the camera communication section 112.

The control device 120 includes a device communication section 121, an input device 122, an output device 123, device storage 124, and a device controller 125. The control device 120 is for example a server.

The device communication section 121 is capable of communicating with an electronic device equipped with a communication device that uses the same communication method (protocol). The device communication section 121 communicates with the camera communication section 112 through the network such as a LAN. The device communication section 121 is for example a communication module (communication device) such as a LAN board. The device communication section 121 receives the captured image data from the camera communication section 112.

The input device 122 receives an instruction to the control device 120 from the user. For example, the input device 122 receives an instruction to select some of a plurality of candidate detection ranges and set the selected candidate detection ranges as a detection range. The input device 122 according to the present embodiment includes a keyboard and a mouse. Alternatively, the input device 122 includes a touch sensor. Note that the input device 122 is an example of what may be referred to as an input section.

The output device 123 outputs the captured image based on the captured image data received by the device communication section 121. The output device 123 also displays the candidate detection ranges and the detection range in a detection range setting process. The output device 123 according to the present embodiment has a display. The display for example includes a liquid-crystal display. Note that the control device 120 may include an input/output device having functions of the input device 122 and the output device 123. The input/output device includes a liquid-crystal display with a touch panel.

The device storage 124 stores therein the captured image data received from the imaging device 110 and various other data. The device storage 124 includes a storage device and semiconductor memory. The storage device for example includes either or both of a hard disk drive (HDD) and a solid state drive (SSD). The semiconductor memory for example includes RAM and ROM. The device storage 124 is an example of what may be referred to as storage.

The device storage 124 stores the captured image data received from the imaging device 110 through the device communication section 121.

The device controller 125 includes an assignment section 125a, a count section 125b, a setting section 125c, a display controller 125d, and a detection section 125e. The device controller 125 controls operation of each section of the control device 120 by executing a device control program stored in the device storage 124. The device controller 125 includes a processor. The processor includes a microcomputer. Alternatively, the processor may include an application specific processing unit. The device communication section 121, the device storage 124, and the device controller 125 are an example of what may be referred to as a data acquisition section.

The assignment section 125a assigns a plurality of candidate detection ranges to the captured image. For example, the assignment section 125a assigns 64 candidate detection ranges in eight rows and eight columns to a captured image M.

The count section 125b counts the number of occurrences of a specific event in each of the candidate detection ranges. The number of occurrences of the specific event is also referred to below simply as the "number of occurrences". For example, the detection section 125e detects the specific event in the captured image M equivalent to a specific period of time, and the count section 125b specifies two or more of the candidate detection ranges that exhibit the detected specific event. The count section 125b accumulates the number of occurrences of the specific event in association with each of the specified candidate detection ranges. The device storage 124 stores an accumulated value of the number of occurrences in association with each of the candidate detection ranges. The specific period of time may for example be a particular time of a previous day or a particular time of each of days in one week or in one month. The term "specific event" as used herein means for example an event such as trespassing of a person in a restricted area, removal of equipment, an article left unattended, and staying longer than a specific period of time. Note that in a situation in which a detection target is specified, mere passing of a person with the detection target may also be included as a specific event. For example, passing of a child with a balloon may be included as a specific event.

The setting section 125c selects some of the candidate detection ranges and sets the selected candidate detection ranges as a detection range based on the number of occurrences of the specific event. For example, the setting section 125c presets at least one threshold of the number of occurrences of the specific event, specifies some candidate detection ranges based on the threshold, and sets the detection range including the specified candidate detection ranges. The threshold of the number of occurrences of the specific event may be an average number of occurrences per day or a cumulative number of occurrences in a specific period of time.

The display controller 125d directs the output device to change display of the number of occurrences of the specific event by time of day. The display controller 125d may further direct the output device 123 to display a boundary set for the specified candidate detection ranges among the candidate detection ranges assigned to the captured image based on the number of occurrences and the preset threshold.

The detection section 125e detects the specific event occurring in the detection range out of the captured image M based on the captured image data.

The configuration in which the detection section 125e only targets some of the candidate detection ranges can reduce the amount of data processing necessary for the detection compared to a configuration in which the detection section 125e targets the entirety of the captured image.

Note that the detection section 125e may mask the detection range set by the setting section 125c in the captured image M to detect the specific event.

Upon receiving the captured image data from the imaging device 110 in real time, the device controller 125 forwards the received captured image data or the captured image data stored in the device storage 124 to the output device 123, so that the captured image is output. Alternatively, upon receiving an instruction to output the captured image from the user through the input device 122, the device controller 125 forwards the received captured image data or the captured image data stored in the device storage 124 to the output device 123, so that the captured image is output.

The following describes a process of setting some of candidate detection ranges md11 to md88 as detection ranges in the captured image M with reference to FIGS. 2 to 8.

Figure 2:
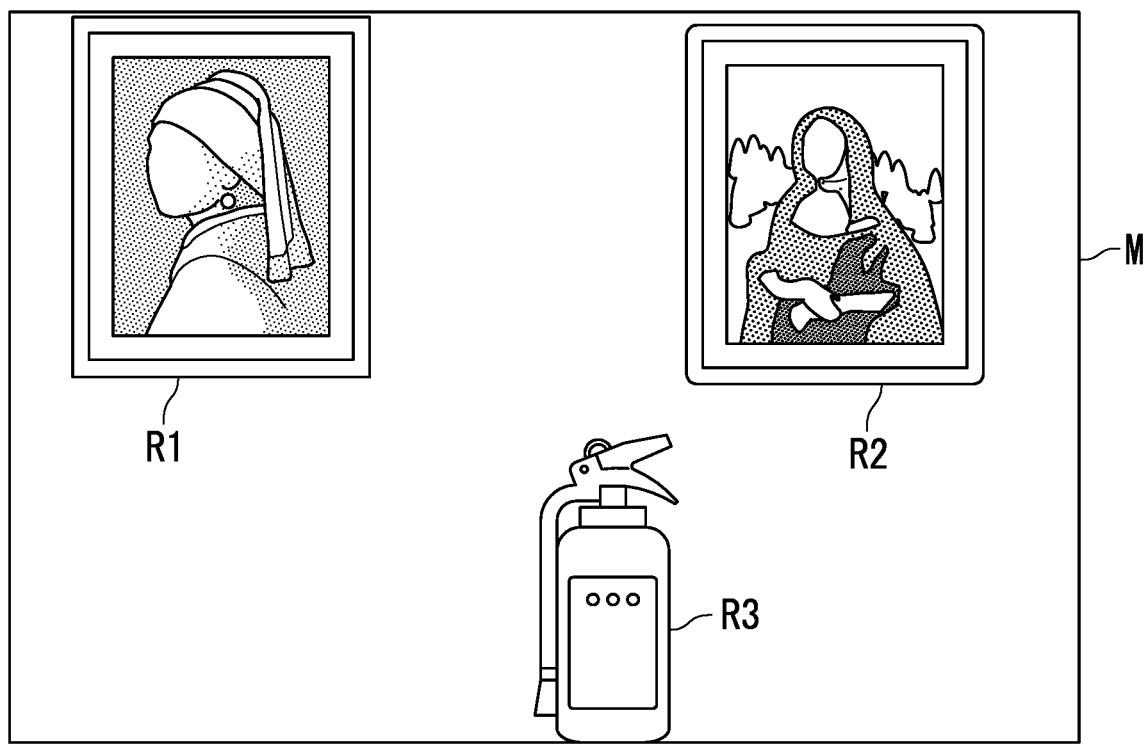
FIG. 2 is a schematic illustration of an image captured in the monitoring system.

FIG. 2 is a schematic illustration of the captured image M obtained in the monitoring system 100. The captured image M includes an image region R1, an image region R2, and an image region R3. The image region R1 is located in an upper left portion of the captured image M and shows an image of a painting of a first woman in a frame. The image region R2 is located in an upper right portion of the captured image M and shows an image of a painting of a second woman in a frame. The image region R3 is located in a lower middle portion of the captured image M and shows an image of a fire extinguisher.

Figure 3:
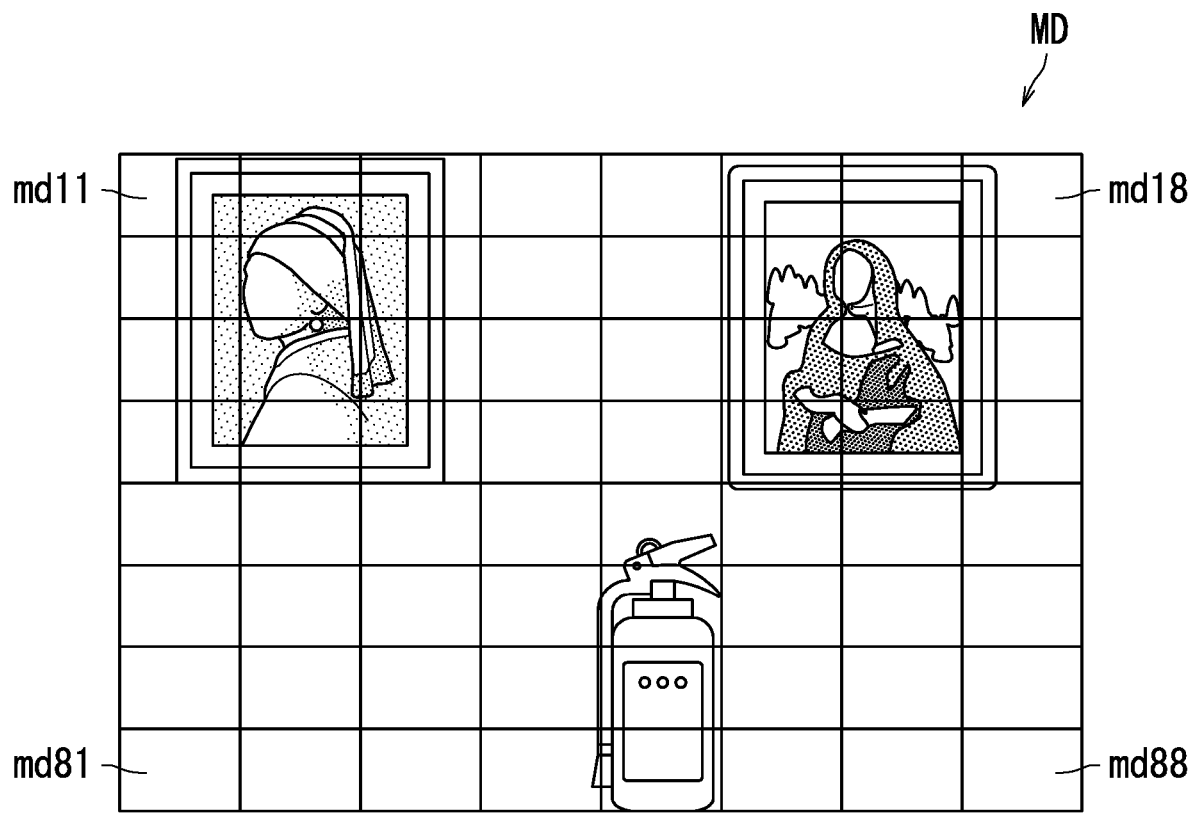
FIG. 3 is a schematic illustration of the image captured in the monitoring system and assigned a plurality of candidate detection ranges.

FIG. 3 is a schematic illustration of the captured image M assigned the candidate detection ranges md11 to md88. The captured image M assigned the candidate detection ranges md11 to md88 is depicted as an "overall candidate detection range MD". The user can give an instruction specifying a method of assigning the candidate detection ranges to the captured image M through the input device 122 illustrated in FIG. 1. The assignment section 125*a* can assign the candidate detection ranges to the captured image M in accordance with a predetermined assignment method. Alternatively, the assignment section 125*a* can assign the candidate detection ranges to the captured image M in accordance with an instruction from the user.

For example, the assignment section 125*a* assigns a plurality of candidate detection ranges arranged in a matrix having a plurality of rows and a plurality of columns to the captured image M. Specifically, the assignment section 125*a* assigns the candidate detection ranges md11 to md88 in eight rows and eight columns to the captured image M. Note that a length of the captured image M in a row direction is longer than a length of the captured image M in a column direction. Likewise, a length of each of the candidate detection ranges md11 to md88 in the row direction is longer than a length of each of the candidate detection ranges md11 to md88 in the column direction.

Figure 4:
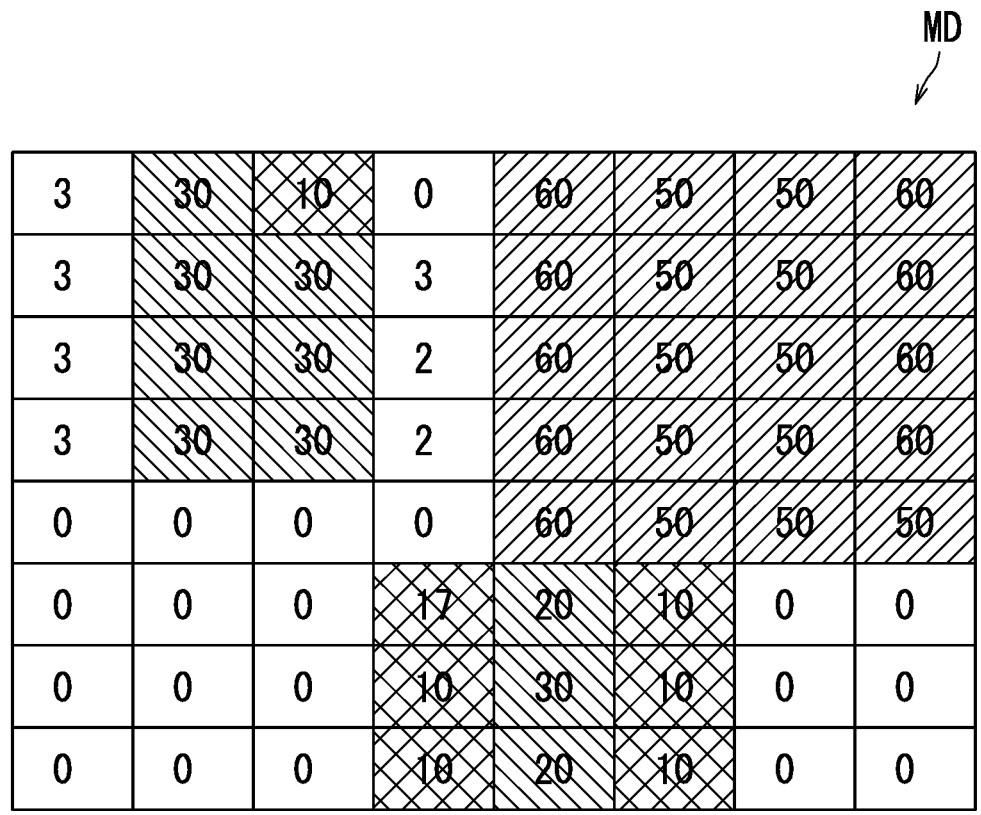
FIG. 4 is a schematic illustration of an example of display of the number of occurrences of a specific event in each of the candidate detection ranges.
Figure 5:
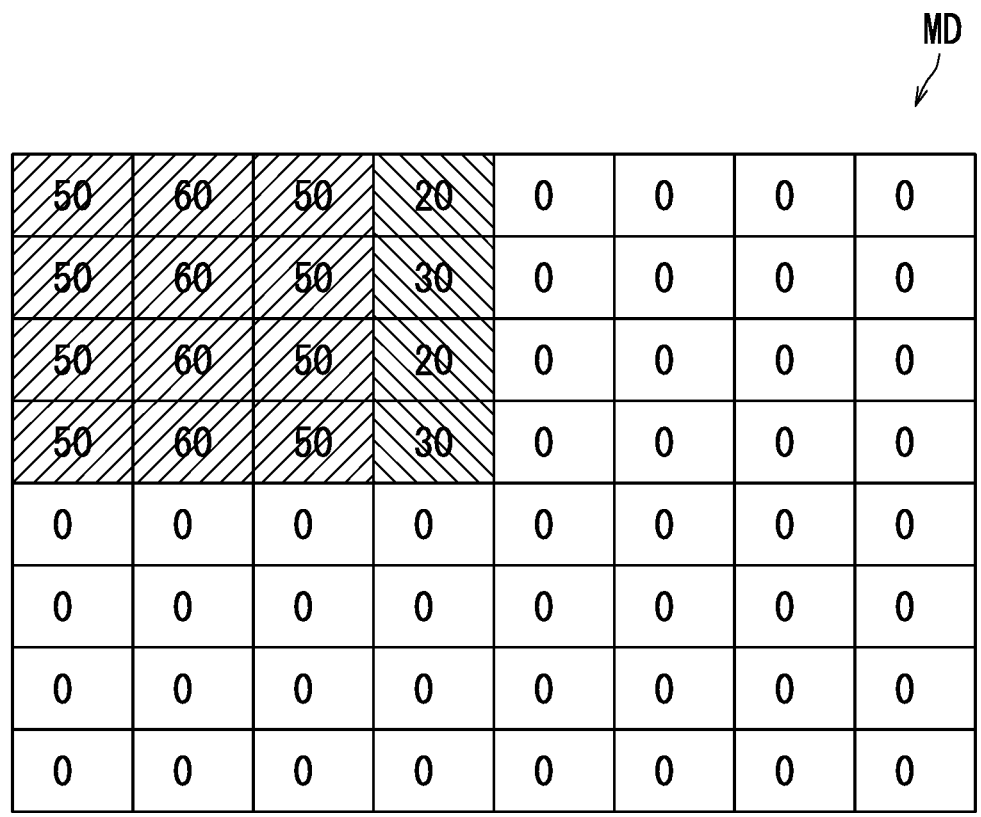
FIG. 5 is a schematic illustration of another example of display of the number of occurrences of the specific event in each of the candidate detection ranges.
Figure 6:
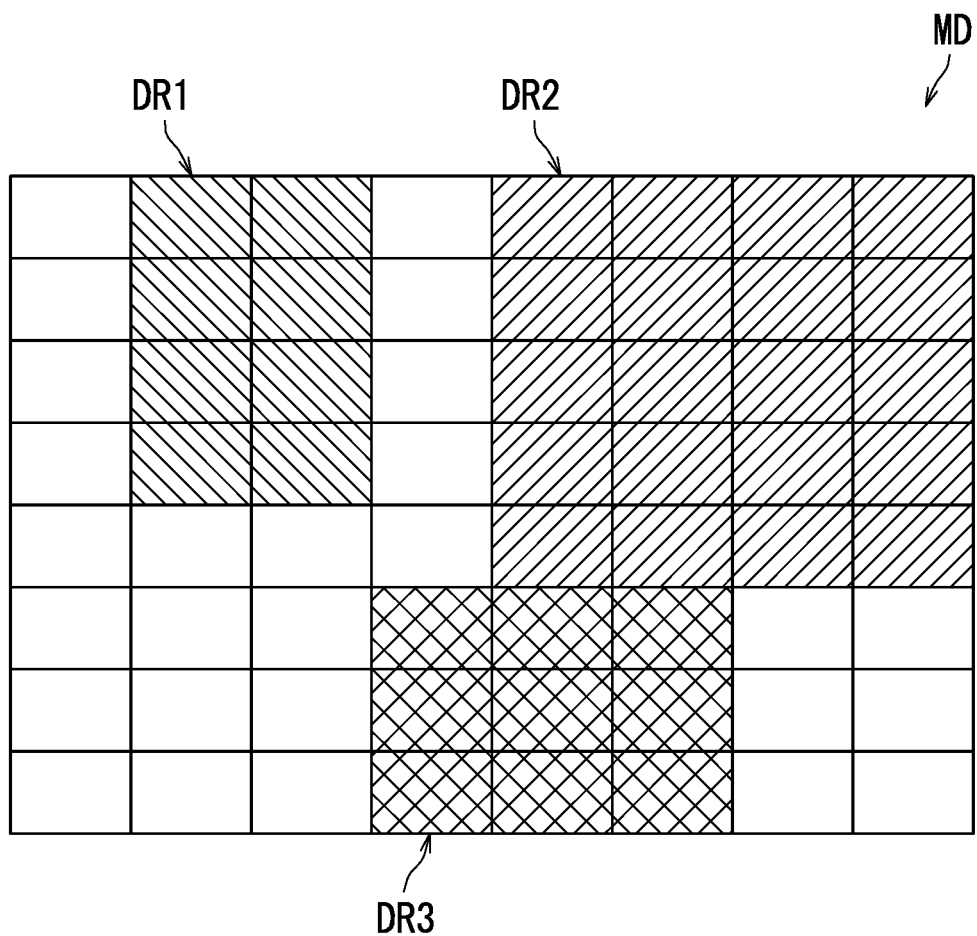
FIG. 6 is a schematic illustration of an example of detection ranges set in the monitoring system.

The following describes the number of occurrences of the specific event in the candidate detection ranges in the monitoring system 100 according to the present embodiment with reference to FIGS. 4 to 6. FIGS. 4 and 5 are schematic illustrations of display of the number of occurrences of the specific event in the candidate detection ranges md11 to md88 in the monitoring system 100 according to the present embodiment. Specifically, FIG. 4 illustrates an example of the number of occurrences of the specific event in the candidate detection ranges md11 to md88 during a particular time of day (for example, morning hours). FIG. 5 illustrates an example of the number of occurrences of the specific event in the candidate detection ranges md11 to md88 during another time of day (for example, afternoon hours).

As illustrated in FIG. 4, the specific event occurred frequently in upper left candidate detection ranges, upper right candidate detection ranges, and lower middle candidate detection ranges among the candidate detection ranges md11 to md88 during the morning hours (for example from 9 a.m. to 12 noon). Specifically, the specific event occurred most frequently in the 20 upper right candidate detection ranges md15 to md18, md25 to md28, md35 to md38, md45 to md48, and md55 to md58, and the number of occurrences of the specific event therein is 50 or 60. The specific event occurred second most frequently in the eight upper left candidate detection ranges md12, md13, md22, md23, md32, md33, md42, and md43, and the number of occurrences of the specific event therein is 10 or 30. The specific event occurred less frequently in the nine lower middle candidate detection ranges md64 to md66, md74 to md76, and md84 to md86, and the number of occurrences of the specific event therein is 10 to 30. Note that the specific event occurred a few times (two or three times) in other candidate detection ranges such as the candidate detection ranges md11 and md44, but it is not necessary to take into account such candidate detection ranges for setting of the detection ranges as long as the number of occurrences of the specific event therein is not so significant as compared to the candidate detection ranges in which the specific event occurred more frequently.

During the afternoon hours (for example, 1 p.m. to 6 p.m.), as illustrated in FIG. 5, the specific event occurred only in upper left candidate detection ranges among the candidate detection ranges md11 to md88. Specifically, the specific event occurred only in the 16 upper left candidate detection ranges md11 to md14, md24 to md24, md31 to md34, and md41 to md44, and the number of occurrences of the specific event therein is 20 to 60.

Based on the result of the occurrences of the specific event, the setting section 125*c* sets a detection range DR1 including the candidate detection ranges corresponding to an area including the painting of the first woman and the vicinity thereof, a detection range DR2 including the candidate detection ranges corresponding to an area including the painting of the second woman and the vicinity thereof, and a detection range DR3 including the candidate detection ranges corresponding to an area including the fire extinguisher and the vicinity thereof as detection ranges for the morning hours. The setting section 125*c* further sets the detection range DR1 including the candidate detection ranges corresponding to the area of the painting of the first woman as a detection range for the afternoon hours.

As a result of the detection ranges being set as described above, detection of the specific event can be performed on the detection ranges DR1, DR2, and DR3 in the monitoring during the morning hours, and detection of the specific event can be performed on the detection range DR1 in the monitoring during the afternoon hours.

Thus, in a situation in which the number of occurrences of the specific event differs between times of day, the amount of data processing necessary for the detection of the specific event can be reduced by setting detection ranges according to the situation.

FIG. 6 is a schematic illustration of an example of the detection ranges set in the monitoring system 100 according to the present embodiment. FIG. 6 shows the detection ranges DR1, DR2, and DR3 set by the setting section 125*c* in a distinguishable manner. For example, the setting section 125*c* sets the candidate detection ranges corresponding to the area of the painting of the first woman, the candidate detection ranges corresponding to the area of the painting of the second woman, and the candidate detection ranges corresponding to the area of the fire extinguisher as the detection range DR1, the detection range DR2, and the detection range DR3, respectively, for the morning hours. The setting section 125*c* further sets the candidate detection ranges corresponding to the area of the painting of the first woman as the detection range DR1 for the afternoon hours.

Note that the display controller 125d may direct the output device to display boundaries of the detection ranges DR1, DR2, and DR3 based on the number of occurrences and the preset threshold. For example, each of the boundaries may be displayed in bold.

Figure 7:
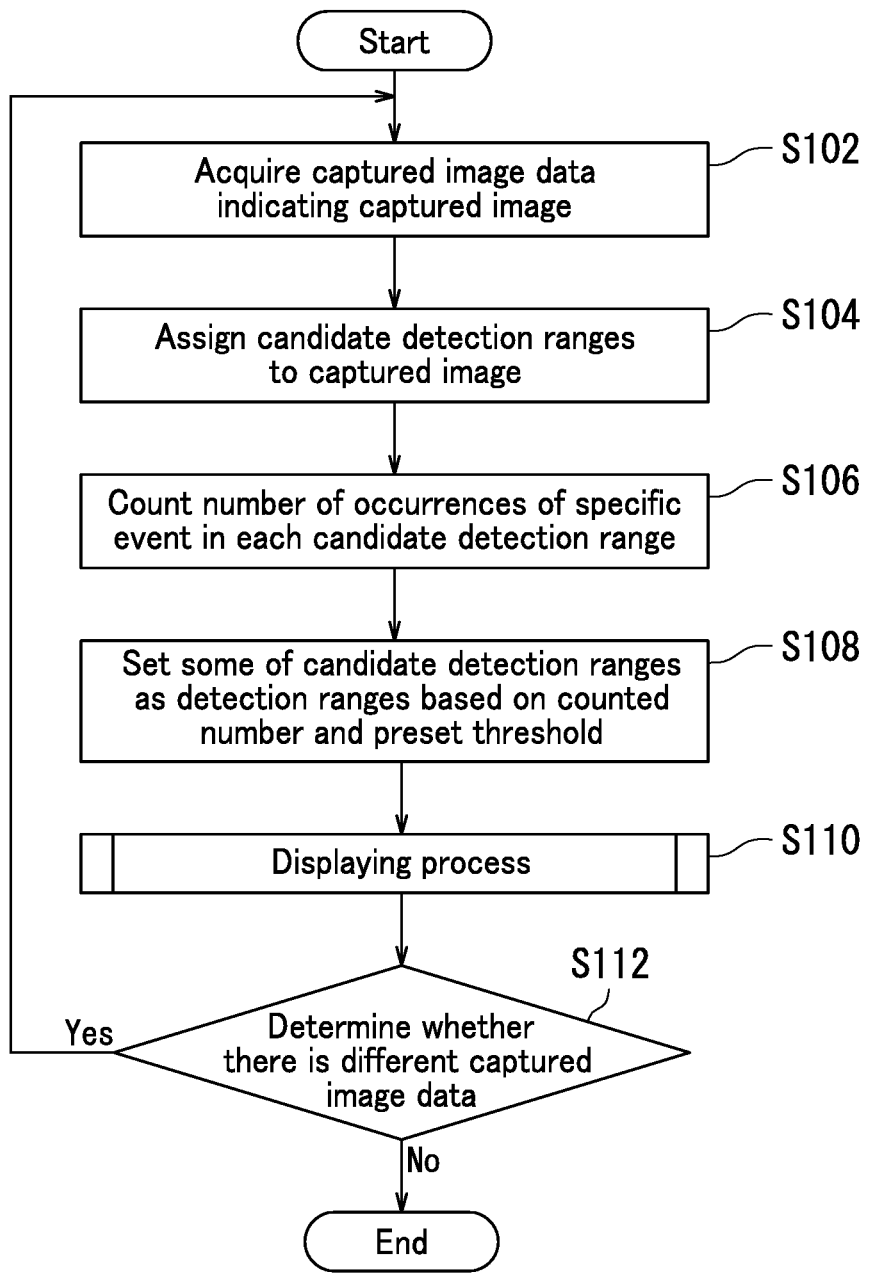
FIG. 7 is a flowchart illustrating a detection range setting process.
Figure 8:
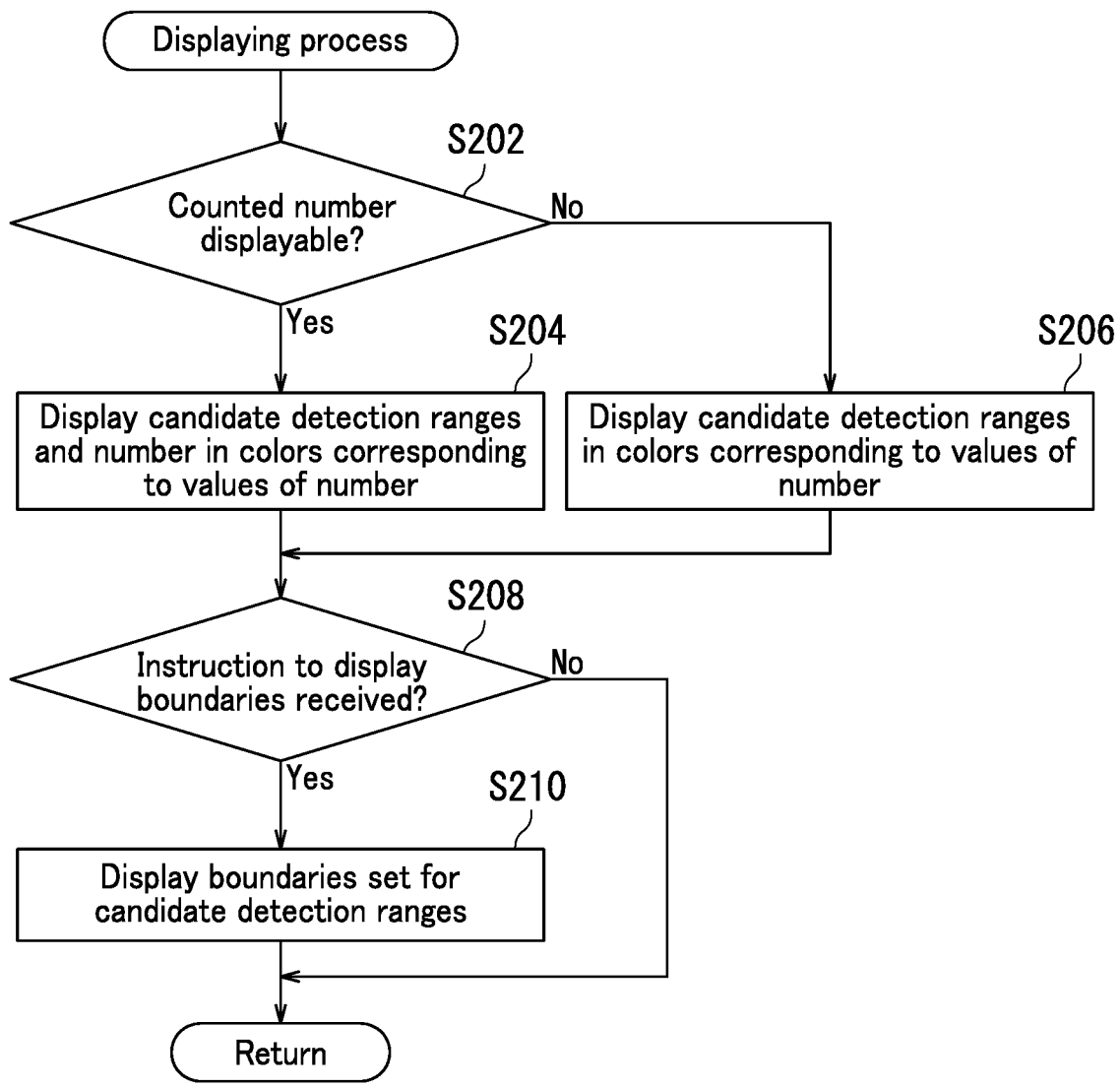
FIG. 8 is a flowchart illustrating a displaying process in the detection range setting process.

The following describes the detection range setting process that is performed in the monitoring system 100 according to the present embodiment with reference to FIGS. 7 and 8. FIG. 7 is a flowchart illustrating the detection range setting process that is performed in the monitoring system 100.

First, as illustrated in FIG. 7, the device controller 125 acquires captured image data indicating a captured image through the device communication section 121 (Step S102). The device controller 125 may acquire the captured image data by reading out the captured image data from the device storage 124.

Next, the assignment section 125a assigns a plurality of candidate detection ranges to the captured image M (Step S104). For example, the assignment section 125a assigns the 64 candidate detection ranges md11 to md88 to the captured image M. The device storage 124 stores data about the candidate detection ranges md11 to md88. For example, the device storage 124 stores data indicating positions of the respective candidate detection ranges on a screen, and an initial value and an accumulated value of the number of occurrences in association with each candidate detection range.

Next, the count section 125b counts the number of occurrences of the specific event in each candidate detection range (Step S106). For example, for each of the candidate detection ranges md11 to md88, the count section 125b counts the number of occurrences of the specific event during the morning hours and the number of occurrences of the specific event during the afternoon hours.

Thereafter, the setting section 125c sets some of the candidate detection ranges as one or more detection ranges based on the number of occurrences counted for each of the candidate detection ranges md11 to md88 and the preset threshold of the number of occurrences (Step S108).

Thereafter, the device controller 125 performs a displaying process on the set detection ranges (Step S110). Thereafter, the device controller 125 determines whether or not there is different captured image data (Step S112). Upon determining that there is no different captured image data (No in Step S112), the device controller 125 ends the present process. Upon determining that there is different captured image data (Yes in Step S112), the device controller 125 repeats the above-described steps (Steps S102 to S110).

FIG. 8 is a flowchart illustrating the displaying process that is performed in the monitoring system 100 according to the present embodiment.

First, as illustrated in FIG. 8, the display controller 125d determines whether or not the number of occurrences of the specific event counted for each of the candidate detection ranges is displayable based on the candidate detection ranges assigned to the captured image M (Step S202). For example, when a large number of candidate detection ranges (for example, hundreds of candidate detection ranges) are assigned to the captured image M and it is therefore difficult to display the number of occurrences for each of the candidate detection ranges, the display controller 125d determines that the number of occurrences is not displayable.

Upon determining that the number of occurrences is displayable for each of the candidate detection ranges (Yes in Step S202), the display controller 125d displays the candidate detection ranges in different colors each corresponding to one or more predetermined values of the number of occurrences. At the same time, the display controller 125d displays the number of occurrences counted for each of the candidate detection ranges (Step S204).

Upon determining that the number of occurrences is not displayable for each of the candidate detection ranges (No in Step S202), the display controller 125d only displays the candidate detection ranges in different colors each corresponding to one or more values of the number of occurrences (Step S206). For example, the display controller 125d displays candidate detection ranges in which the number of occurrences is 0 to 9 in white, candidate detection ranges in which the number of occurrences is 10 to 19 in blue, candidate detection ranges in which the number of occurrences is 20 to 39 in yellow, and candidate detection ranges in which the number of occurrences is 40 to 69 in red. Note that the user may manually select desired candidate detection ranges while viewing a screen (FIG. 4 or 5) displaying the number of occurrences for each of the candidate detection ranges. Then, the setting section 125c may set the candidate detection ranges selected by the user as the detection ranges.

Next, the display controller 125d determines whether or not an instruction to display boundaries set for the candidate detection ranges has been received from the user (Step S208). Upon determining that an instruction to display the boundaries set for the candidate detection ranges has been received from the user (Yes in Step S208), the display controller 125d performs a process of displaying the boundaries set for the candidate detection ranges (Step S210). For example, the display controller 125d shows peripheries of the respective detection ranges DR1, DR2, and DR3 in bold to display the boundaries. Upon determining that an instruction to display the boundaries set for the candidate detection ranges has not been received from the user (No in Step S208), the display controller 125d does not display the boundaries.

As described above, the monitoring system 100 can set one or more detection ranges by time of day.

Through the above, the present embodiment has been described with reference to the drawings (FIGS. 1 to 8). However, the present disclosure is not limited to the above embodiment and may be implemented in various different forms that do not deviate from the essence of the present disclosure. Furthermore, the configuration in the above embodiment is merely an example that does not impose any particular limitations and can be altered in various ways to the extent that there is not substantial deviation from the effects of the present disclosure. For example, the imaging device 110 may have functions equivalent to those of the input device 122, the output device 123, the device storage 124, and the device controller 125 of the control device 120.

What is claimed is:
1. A monitoring system comprising:
 a data acquisition section configured to acquire captured image data indicating a captured image;
 an assignment section configured to assign a plurality of candidate detection ranges to the captured image, the candidate detection ranges arranged in a matrix having a plurality of rows and a plurality of columns;
 a count section configured to count the number of occurrences of a specific event in each of the candidate detection ranges;
 storage configured to store therein the number of occurrences of the specific event in association with each of the candidate detection ranges;

a display controller configured to display the candidate detection ranges and the number of occurrences of the specific event in association with each other;

an input section configured to receive an instruction from a user;

a setting section configured to set any of the candidate detection ranges as a detection range based on the number of occurrences of the specific event and the instruction from the user; and a detection section configured to detect the specific event in the set detection range out of the captured image based on the captured image data, wherein the setting section specifies some candidate detection ranges to be included in the detection range among the candidate detection ranges based on the number of occurrences of the specific event and at least one predetermined threshold.

2. The monitoring system according to claim 1, wherein the display controller changes display of the number of occurrences of the specific event by time of day.

3. The monitoring system according to claim 1, wherein the display controller displays a boundary set for the detection range based on the number of occurrences of the specific event and at least one predetermined threshold.

4. The monitoring system according to claim 1, wherein the display controller displays the candidate detection ranges in different colors based on the number of occurrences of the specific event and at least one predetermined threshold.

5. The monitoring system according to claim 4, wherein the display controller:

determines whether or not the number of occurrences of the specific event counted for each of the candidate detection ranges is displayable;

displays the number of occurrences of the specific event while displaying the candidate detection ranges in different colors upon determining that the number of occurrences of the specific event is displayable; and displays only the candidate detection ranges in different colors each corresponding to one or more values of the number of occurrences of the specific event upon determining that the number of occurrences of the specific event is not displayable.

6. The monitoring system according to claim 1, wherein the count section counts the number of occurrences of the specific event by time of day, and the setting section changes the specified candidate detection ranges that are included in the detection range among the candidate detection ranges by time of day.

* * * * *